United States Patent
Matsumoto et al.

(10) Patent No.: US 7,776,480 B2
(45) Date of Patent: Aug. 17, 2010

(54) FUEL CELL SYSTEM AND METHOD FOR PERMITTING IDLE STOP IN FUEL CELL SYSTEM

(75) Inventors: Yuji Matsumoto, Saitama (JP); Kenichiro Ueda, Saitama (JP); Dai Saitoh, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 950 days.

(21) Appl. No.: 11/519,677

(22) Filed: Sep. 12, 2006

(65) Prior Publication Data

US 2007/0059569 A1 Mar. 15, 2007

(30) Foreign Application Priority Data

Sep. 12, 2005 (JP) .............................. 2005-263702

(51) Int. Cl.
*H01M 8/04* (2006.01)
(52) U.S. Cl. ........................ 429/408; 429/427; 429/428; 429/429
(58) Field of Classification Search ................... 429/34
See application file for complete search history.

(56) References Cited

FOREIGN PATENT DOCUMENTS

| JP | 2001-359204 A | 12/2001 |
| JP | 2004-173450 | 6/2004 |
| JP | 2004-179100 | 6/2004 |
| JP | 2004-179100 | * 11/2009 |

OTHER PUBLICATIONS

Japanese Office Action for Application No. 2005-263702, dated Mar. 31, 2009.

* cited by examiner

*Primary Examiner*—Dah-Wei D Yuan
*Assistant Examiner*—Jacob Marks
(74) *Attorney, Agent, or Firm*—Lahive & Cockfield, LLP; Anthony A. Laurentano, Esq.

(57) ABSTRACT

A fuel cell system is provided which includes a fuel cell to which fuel gas and oxidizing gas are supplied to generate electricity, a purge valve which purges fuel gas discharged from the fuel cell, a dilutor which mixes the purged fuel gas with the oxidizing gas and purges the purged fuel gas mixed with the oxidizing gas into the atmosphere, and an ECU which stops supply of the oxidizing gas to the fuel cell so as to cause an idle stop and determines whether to permit the idle stop depending on a concentration of the fuel gas in the dilutor.

1 Claim, 2 Drawing Sheets

FUEL CELL SYSTEM AND METHOD FOR PERMITTING IDLE STOP IN FUEL CELL SYSTEM

CROSS REFERENCE TO RELATED APPLICATIONS

This application claims the foreign priority benefit under Title 35, United States Code, §119(a)-(d) of Japanese Patent Application No. 2005-263702, filed on Sep. 12, 2005 in the Japan Patent Office, the disclosure of which is herein incorporated by reference in its entirety.

BACKGROUND OF THE INVENTION

1. Field of the Invention

The present invention relates to a fuel cell system and a method for permitting an idle stop in the fuel cell system, and more specifically, to a fuel cell system where an idle stop is performed and a method for permitting the idle stop in the fuel cell system.

2. Description of the Related Art

In recent years, a solid polymer type fuel cell has been a focus of attention as a power source of an electric vehicle, and so on. The solid polymer type fuel cell is a stack of cells each of which is formed of a solid polymer electrolyte membrane sandwiched between a pair of electrodes (an anode and a cathode). In a fuel cell system including such a fuel cell, hydrogen (fuel gas) supplied to the anode is ionized on a catalyst layer and emits electrons. The electrons are taken out of an outside circuit where the electrons are flowing toward the cathode, to be used as direct current electric energy. Hydrogen ions migrate to the cathode through the solid polymer type electrolyte membrane. Then, the hydrogen ions are combined with air (oxidizing gas) supplied to the cathode and the electrons which have come through the external circuit, so as to generate water.

A vehicle equipped with such a fuel cell system has a technology for permitting an idle stop depending on states of driving speed, output power, and brake operation in order to improve fuel cost (See JP2001-359204 A, for instance). In the technology, when it is detected that the vehicle is being idle, supply of air to the fuel cells is stopped so that the power generation of the fuel cells is stopped.

SUMMARY OF THE INVENTION

Hydrogen offgas, which have not chemically reacted in the fuel cell, is purged into a dilution box, diluted with air, and then purged outside the vehicle. However, in the prior art, there has been the following problem. For instance, when idling is stopped, that is driving of a compressor is stopped so as to stop supply of air, immediately after the hydrogen offgas has been purged, the hydrogen offgas in the dilution box is not sufficiently diluted and gradually purged outside the vehicle.

In view of the above, it is an object of the present invention to provide a fuel cell system which controls a concentration of purged fuel gas when idling is stopped not to exceed a predetermined value and a method for permitting an idle stop in the fuel cell system, so as to solve the above-mentioned problem.

To solve the above-mentioned problem, in an aspect of the invention, there is provided a fuel cell system including a fuel cell to which fuel gas and oxidizing gas are supplied to generate electricity, a purger which purges fuel gas discharged from the fuel cell, a mixer which produces a mixture of the purged fuel gas and the oxidizing gas and purges the mixture into atmosphere, an idle stop controller which stops supply of the oxidizing gas to the fuel cell so as to cause an idle stop, and an idle stop permission determiner which determines whether to permit the idle stop depending on a concentration of the fuel gas in the mixer.

In the fuel cell system according to the invention, the idle stop permission determiner determines whether to permit the idle stop depending on the concentration of the fuel gas in the mixer. The idle stop controller controls the idle stop. Thus, the idle stop is permitted only when it is determined that the concentration of the fuel gas has sufficiently decreased. Accordingly, the concentration of the purged fuel gas during the idle stop can be controlled not to exceed a predetermined value.

The fuel cell system may further include a planned supply volume calculator which calculates a planned supply volume of oxidizing gas to be supplied to the mixer based on a volume of the fuel gas purged by the purger, and an integrated supply volume calculator which calculates an integrated supply volume of oxidizing gas which has been supplied to the mixer, wherein the idle stop permission determiner does not permit the idle stop as long as the integrated supply volume does not exceed the planned supply volume.

In the fuel cell system according to the invention, the idle stop is not permitted but prohibited while the integrated supply volume does not exceed the planned supply volume. Thus, idling is not stopped while the oxidizing gas is of little volume compared with that of the fuel gas and is not sufficiently mixed. Therefore, the concentration of the fuel gas in the mixer is controlled not to increase.

In another aspect of the invention, there is provided a method for permitting an idle stop in a fuel cell system including steps of acquiring a concentration of fuel gas in a mixer, permitting an idle stop depending on the concentration of the fuel gas, and stopping supply of oxidizing gas to a fuel cell after the idle stop is permitted.

In the method for permitting the idle stop according to the invention, it is determined whether to permit the idle stop depending on the concentration of the fuel gas in the mixer. Then, idling is controlled to be stopped after the idle stop is permitted. Thus, the idle stop is permitted only when it is determined that the concentration of the fuel gas has sufficiently decreased. Accordingly, the concentration of the purged fuel gas during the idle stop can be controlled not to exceed the predetermined value.

In a further aspect of the invention, there is provided a method for permitting an idle stop in a fuel cell system including steps of calculating a planned supply volume of oxidizing gas to be supplied to a mixer based on a volume of fuel gas purged by a purger, calculating an integrated supply volume of oxidizing gas which has been supplied to the mixer, permitting an idle stop when the integrated supply volume exceeds the planned supply volume, and stopping supply of oxidizing gas to a fuel cell after the idle stop is permitted.

In the method for permitting the idle stop according to the invention, the idle stop is permitted when the integrated supply volume exceeds the planned supply volume. Therefore, idling is stopped only when the oxidizing gas is of large volume compared with that of the fuel gas and is well mixed. As a result, the concentration of the fuel gas in the mixer is controlled not to increase.

DESCRIPTION OF THE PREFERRED EMBODIMENTS

Figure 1:
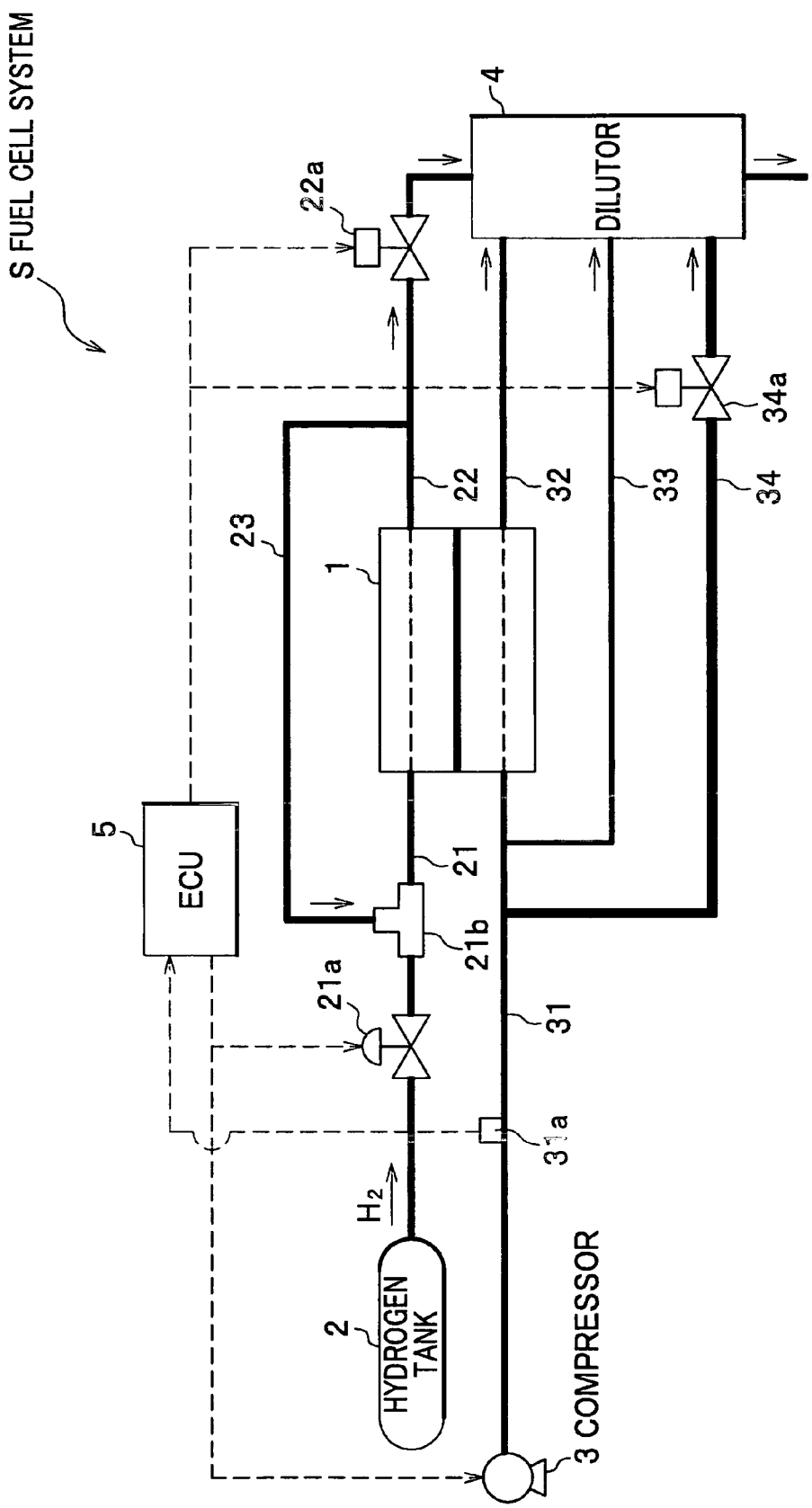
FIG. 1 is a schematic diagram of a fuel cell system according to the present embodiment.

Here will be described embodiments of the present invention in detail, referring to the accompanying drawings as needed. FIG. 1 is a schematic diagram of a fuel cell system according to the present embodiment.

A fuel cell system S shown in FIG. 1 is used as a power source of an electric vehicle (a fuel cell vehicle). The fuel cell system S mainly includes a fuel cell 1, a hydrogen tank 2 which supplies hydrogen gas (fuel gas) to the fuel cell 1, a compressor 3 which supplies air (oxidizing gas) including oxygen to the fuel cell 1, a dilutor 4 (a mixer) which dilutes hydrogen gas discharged from the fuel cell 1 and purges the diluted hydrogen gas to the atmosphere, and an ECU 5 which is a control unit.

A fuel cell stack is a stack of fuel cells each of which is formed of an anode and a cathode between which a solid polymer electrolyte membrane is inserted. (FIG. 1 shows a single fuel cell.) Hydrogen gas and air are respectively supplied to gas pipes on the anode and cathode sides of the fuel cell 1. Then, hydrogen ions generated in a catalyst layer in the anode migrate to the cathode through the solid polymer electrolyte membrane. Accordingly, the hydrogen ions are combined with oxygen in a catalyst layer in the cathode to generate water while power is generated in the fuel cell. A set of gas pipes for the hydrogen gas is referred to as an anode system while a set of gas pipes for the air is referred to as a cathode system, hereafter.

Next, each of the other components of the fuel cell system S will be described along flows of the hydrogen gas and the air supplied to the fuel cell 1.

A Hydrogen tank 2 is a tank where hydrogen is stored at a high pressure such as, for example, 35 MPa. The hydrogen gas is released from the hydrogen tank 2 and supplied to a gas pipe on the anode side of the fuel cell 1 through a hydrogen gas supply pipe 21. Some of the hydrogen which is supplied to the fuel cell 1 remains not chemically reacted. The hydrogen gas including the unreacted hydrogen (referred to as "hydrogen offgas", hereafter) is purged to a dilutor 4, which will be described later, through a hydrogen gas discharge pipe 22, or returned to the hydrogen gas supply pipe 21 through a hydrogen gas circulation pipe 23 in order to be recycled.

A shutoff valve 21a and an ejector 21b are provided to the hydrogen gas supply pipe 21 one after the other from upstream to downstream. The shutoff valve 21a is opened to release the hydrogen gas from the hydrogen tank 2 and closed to shut off the flow of the hydrogen gas. The ejector 21b connects the hydrogen gas supply pipe 21 with the hydrogen gas circulation pipe 23. Thus, the hydrogen released from the hydrogen tank 2 is mixed with the hydrogen discharged and returned from the fuel cell 1 to be supplied to the fuel cell 1.

The hydrogen gas discharge pipe 22 is connected with one end of the hydrogen gas circulation pipe 23 whose other end is connected with the ejector 21b. In addition, a purge valve 22a (a purger) is provided in a downstream side of the hydrogen gas discharge pipe 22. The purge valve 22a is opened intermittently in accordance with instructions from the ECU 5 so as to purge the hydrogen offgas which includes impurities such as nitrogen accumulated during recycle.

The compressor 3 is an apparatus which compresses air. The air compressed by the compressor 3 is supplied to a gas pipe on the cathode side of the fuel cell 1 through the air supply pipe 31. Some oxygen in the air supplied to the fuel cell 1 is not chemically reacted. The air including the unreacted oxygen (referred to as "air offgas", hereafter) is purged to the dilutor 4, which will be described later, through an air discharge pipe 32.

A gas flow sensor 31a is provided to the air supply pipe 31. In addition, a first dilution gas supply pipe 33 and a second dilution gas supply pipe 34 are connected with the air supply pipe 31. The gas flow sensor 31a is a sensor which detects a flow rate of the air supplied from the compressor 3. For instance, a hot wire type airflow meter or the like can be employed as the gas flow sensor 31a. The hot wire type air flow meter includes a wire (referred to as a hot wire, hereafter) which is a part of an electric bridge circuit. In order to keep balance of the bridge circuit, electric current flows and temperature of the hot wire is kept higher than temperature of the supplied air by a predetermined temperature. As the flow rate of the supplied air increases, heat dissipated from the hot wire increases so as to increase electric current necessary to keep difference of the temperatures constant. Therefore, it is possible to measure the flow rate of the supplied air based on a detected electric current value of the hot wire. Accordingly, the value detected by the gas flow sensor 31a is input to the ECU 5 and the integrated value is calculated in the ECU 5 constantly.

The first dilution gas supply pipe 33 is connected from the air supply pipe 31 to the dilutor 4 so that air can be supplied as dilution gas directly from the air supply pipe 31 to the dilutor 4.

A second dilution gas supply pipe 34 is connected from the air supply pipe 31 to the dilutor 4 between which an air-assist valve 34a, which is normally closed, is provided. The second dilution gas supply pipe 34 is a gas pipe wider than the first dilution gas supply pipe 33, and can supply a large volume of air to the dilutor 4 while the air-assist valve 34a is opened. Thus, it is possible to dilute the hydrogen offgas in a short time.

The dilutor 4 is connected with the downstream sides of the air discharge pipe 32 and the hydrogen gas discharge pipe 22. In the dilutor 4, the hydrogen offgas supplied from the hydrogen gas discharge pipe 22 is diluted with the air offgas supplied from the air discharge pipe 32 and purged outside.

The ECU 5, which includes a CPU, a RAM, a ROM, and input/output circuits, sends an idle stop request signal during idling and determines whether to permit the idle stop based on the detected value input from the gas flow sensor 31a. The ECU 5 controls to stop driving the compressor 3 when the idle stop is permitted. Moreover, the ECU 5 sets a volume to complete dilution (a planned supply volume) which is enough to dilute the hydrogen offgas purged to the dilutor 4.

Starting immediately after the purge of the hydrogen offgas is completed, the ECU 5 continually calculates a volume of the air purged from the air discharge pipe 32 and the first dilution gas supply pipe 33 to the dilutor 4 based on the detected value input from the gas flow sensor 31a, and sums the calculated volume of the air to obtain an integrated air volume (an integrated supply volume). Thus, whether to open the air-assist valve 34a is determined based on the integrated air volume when the idle stop is requested. The volume of the air purged to the dilutor 4 is calculated from ratios of pressure drops in the air discharge pipe 32, the first dilution gas supply pipe 33, and the second dilution gas supply pipe 34 based on the detected value input from the gas flow sensor 31a when the air assist valve 34a is opened. Thus calculated air volume is summed to be the integrated air volume.

Moreover, the ECU 5 controls driving of the shutoff valve 21a and the purge valve 22a. The ECU 5 includes "an idle stop controller", "an idle stop permission determiner", "a planned supply volume calculator", and "an integrated supply volume calculator" in the claims.

The idle stop means a state where when it is determined that the fuel cell 1 is idling, the driving of the compressor 3 is stopped so that power generation is stopped in the fuel cell 1 with the aim of improving fuel cost. Moreover, the idling means a state where electrical load (for instance, power consumption of a travel motor, accessories, and so on) of the fuel cell 1 is low or zero. For instance, there are cases where a vehicle speed is zero, where a service brake is on, where a gas pedal is off, where cruise is on, and so on in the vehicle in which the fuel cell 1 is installed.

Figure 2:
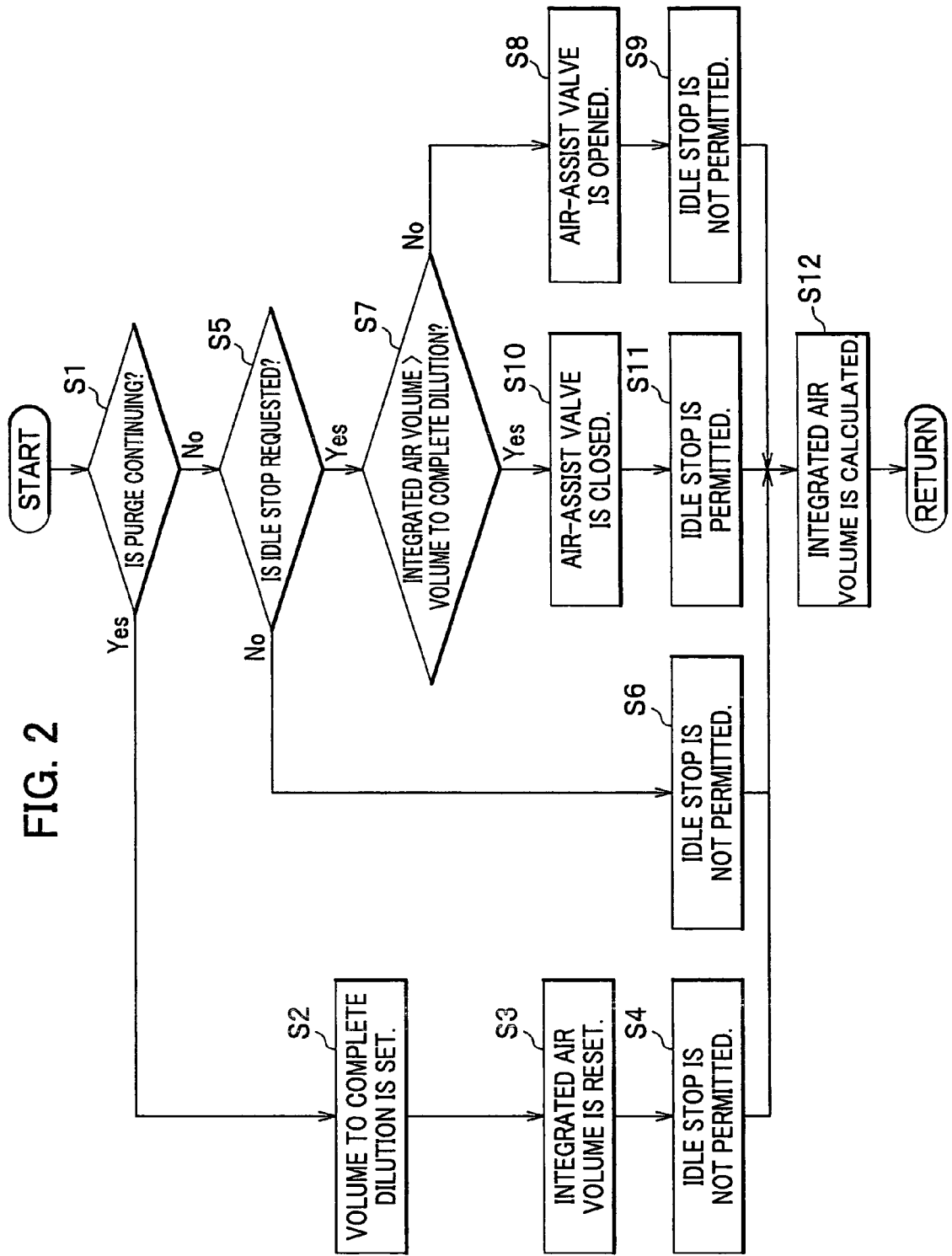
FIG. 2 is a flow chart showing a method for permitting an idle stop in the present embodiment.

Here, a method for permitting the idle stop in the ECU 5 will be described referring to FIG. 2 (and FIG. 1 as needed). FIG. 2 is a flow chart showing the method for permitting the idle stop in the present embodiment.

As shown in FIG. 2, in the ECU 5, it is determined by an open/close status of the purge valve 22a whether the hydrogen offgas is being purged (Step S1). When the purge valve 22a is open and the hydrogen offgas is being purged (Yes in Step S1), the volume to complete dilution which is required to sufficiently dilute the hydrogen offgas is set (Step S2). In addition, the integrated air volume is reset (Step S3). Thus, idling is not stopped (Step S4) and steps from 'START' are repeated after the integrated air volume is calculated (Step S12). In other words, as long as the purge is continuing, idling is not to be stopped and this series of steps are repeated.

On the other hand, when the hydrogen offgas is not being purged (No in Step S1), it is determined whether the idle stop is requested (Step S5). When the idle stop is not requested (No in Step S5), the idle stop is not permitted (Step S6). Then, the integrated air volume is calculated (Step S12) and then the steps from 'START' are repeated.

When the idle stop is requested (Yes in Step S5), it is determined whether the integrated air volume exceeds the volume to complete dilution set in Step S2 (Step S7). When the integrated air volume is less than or equal to the volume to complete dilution (No in Step S7), the air-assist valve 34a is opened (Step S8), and a large volume of air is sent to the dilutor 4. Moreover, the idle stop is not permitted (Step S9) since starting the idle stop causes the concentration of the hydrogen in the dilutor 4, that is, the concentration of the purged hydrogen, to rise. Then, the steps from 'START' are repeated after the integrated air volume is calculated (Step S12).

When the integrated air volume exceeds the volume to complete dilution (Yes in Step S7), it is determined that the dilution in the dilutor 4 has been completed. Thus, the idle stop is permitted (Step S11) after the air-assist valve 34a is closed (Step S10). After that, the steps from 'START' are repeated after the integrated air volume is calculated (Step S12). In the embodiment, as described above, the integrated air volume is used to know whether the dilution has been completed in the dilutor 4 and determine whether to permit the idle stop.

As a result, the following effects can be achieved in the embodiment.

In the fuel cell system S according to the embodiment, only when the integrated air volume exceeds the volume to complete dilution, that is, only when it is determined that the dilution has been completed in the dilutor 4 and that the concentration of hydrogen have sufficiently decreased, the idle stop is permitted. Accordingly, the concentration of the purged hydrogen during the idle stop can be controlled not to exceed the predetermined value.

Moreover, in the fuel cell system S according to the embodiment, when the integrated air volume is less than or equal to the volume to complete dilution, the air-assist valve 34a is opened to send a large volume of air to the dilutor 4 so that the dilutation can be completed in a short time. As a result, idling can be stopped in a short time.

Though the present embodiment has been described above, the invention is not limited to the embodiment but may be variously embodied within the spirit and scope of the following claims.

In the embodiment, the gas flow sensor 31a is provided to the air supply pipe 31. However, the invention is not limited to this. The gas flow sensor 31a may be provided to each of the air discharge pipe 32, the first dilution gas supply pipe 33, and the second dilution gas supply pipe 34 near the dilutor 4. The values detected from these sensors are summed and integrated as needed so that the integrated volume of the air sent to the dilutor 4 can be calculated.

In the embodiment, a hot wire type air flow meter is employed as the gas flow sensor. However, the invention is not limited to this. Various types of gas flow sensors can be employed.

In the embodiment, the integrated air volume determines whether the dilution has been completed in the dilutor 4. However, the invention is not limited to this. How much time has passed since the purge has been completed may be used as a parameter. To be concrete a counter may measure how much time has passed immediately after the purge is completed. Thus, when a predetermined time has passed, it is possible to determine that the hydrogen gas is sufficiently diluted, and therefore to permit the idle stop.

In the embodiment, a constant value is set to the volume to complete dilution. However, the invention is not limited to this. The volume to complete dilution is not limited to a constant value, but may be varied as needed corresponding to situations.

In the fuel cell system and the method for permitting the idle stop in the fuel cell system according to the invention, it is possible to control the concentration of the purged fuel gas when idling is stopped not to exceed a predetermined value.

While the described embodiments represent the preferred forms of the present invention, it is to be distinctly understood that the invention is not limited thereto but may be otherwise variously embodied within the spirit and scope of the following claims.

What is claimed is:

1. A method for permitting an idle stop in a fuel cell system, which comprises a mixer producing a mixture of fuel gas purged from a fuel cell and oxidizing gas and purging the mixture into atmosphere, and determines whether to permit an idle stop depending on a concentration of the fuel gas in the mixer, the method comprising steps of:

calculating a planned supply volume of oxidizing gas to be supplied to the mixer based on a volume of the purged fuel gas;

calculating an integrated supply volume of oxidizing gas which has been supplied to the mixer;

permitting an idle stop when the integrated supply volume exceeds the planned supply volume;

prohibiting an idle stop and supplying a large volume of oxidizing gas to the mixer from an upstream side of the fuel cell when the integrated supply volume does not exceed the planned supply volume; and stopping supply of oxidizing gas to the fuel cell after the idle stop is permitted.

* * * * *